(12) United States Patent  (10) Patent No.: US 6,628,937 B1
Salin                             (45) Date of Patent:      Sep. 30, 2003

(54) VOICE MAIL SERVICE OF A CLOSED USER GROUP IN A MOBILE COMMUNICATION SYSTEM

(75) Inventor: Hannu-Pekka Salin, Vantaa (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/485,495

(22) PCT Filed: Aug. 7, 1998

(86) PCT No.: PCT/FI98/00615

§ 371 (c)(1),
(2), (4) Date: Apr. 18, 2000

(87) PCT Pub. No.: WO99/08468

PCT Pub. Date: Feb. 18, 1999

(30) Foreign Application Priority Data

Aug. 11, 1997 (FI) .................................................. 973294

(51) Int. Cl.[7] .............................................. H04M 11/10
(52) U.S. Cl. ................................. 455/413; 379/211.02
(58) Field of Search ................................ 455/413, 417, 455/565, 414, 445, 461; 379/211.02

(56) References Cited

U.S. PATENT DOCUMENTS 5,475,737 A    12/1995  Garner et al.
5,506,888 A     4/1996  Hayes et al.
5,512,885 A  *  4/1996  Agestam et al. ........ 340/825.52
5,890,064 A  *  3/1999  Widergen et al. ............ 455/426
5,978,681 A  * 11/1999  Bertacchi ..................... 455/414
6,125,126 A  *  9/2000  Hallenstål .................... 370/259

FOREIGN PATENT DOCUMENTS

DE      43 07 966      9/1994
EP        740 480     10/1996
WO       96/11544      4/1996
WO       97/20423      6/1997

* cited by examiner

Primary Examiner—Nay Maung
Assistant Examiner—Tu X Nguyen
(74) Attorney, Agent, or Firm—Pillsbury Winthrop LLP (57) ABSTRACT

A method and apparatus for implementing call forwarding in a mobile communication system comprising one or more closed user groups. The method comprises detecting conditional or unconditional call forwarding to a call forwarding number in connection with call set-up, checking whether set call forwarding is directed to the voice mail, and carrying out call forwarding in response to the fact that call forwarding is directed to the voice mail, regardless of a possible bar to call forwarding due to interaction between the call forwarding facility and the closed user group. The method and system of the invention allow to eliminate the possible problems caused by the restrictions of the closed user group in connection with call forwarding to the voice mail.

17 Claims, 5 Drawing Sheets

| CUG indication from network | M or NM | CUG attributes of subscriber B for basic services | | | | Subscriber B no CUG |
|---|---|---|---|---|---|---|
| | | no OA | | OA | | |
| | | no OCB | OCB | no OCB | OCB | |
| 31 CUG call no OA | M | 311.1 CF | 311.2 rejects | 311.3 CF | 311.4 rejects | 313 rejects |
| | NM | 312.1 rejects | | 312.2 rejects | | |
| 32 CUG call | M | 321.1 CF | 321.2 rejects | 321.3 CF | 321.4 rejects | 323 CF |
| | NM | 322.1 rejects | | 322.3 CF | | |
| 33 Normal | * | 331.1 rejects | | 331.3 CF | | 333 CF |

Fig. 4

| Case | Subscriber A | | Subscriber B | | | | | Call | Forward |
|---|---|---|---|---|---|---|---|---|---|
| | IC | OA | IC | IA | ICB | OA | OCB | | VMB |
| 1. | IC1 | * | IC1 | * | - | * | - | CUG | OK |
| 2. | IC1 | - | IC1 | * | - | * | * | CUG | OK |
| 3. | IC1 | * | IC1 | * | - | * | - | CUG | OK |
| 4. | IC1 | OA | IC1 | * | - | * | - | CUG | OK |
| 5. | IC1 | - | IC1 | * | - | * | - | CUG | OK |
| 6. | IC1 | OA | IC1 | * | - | * | - | CUG | OK |
| 7. | IC1 | OA | IC1 | * | - | * | - | CUG | OK |
| 8. | IC1 | OA | IC1 | * | - | * | - | CUG | OK |
| 9. | IC2 | * | IC1 | * | - | * | - | CUG | OK |
| 10. | IC2 | - | IC1 | * | - | * | - | CUG | OK |
| 11. | IC2 | OA | IC1 | * | - | * | - | CUG | OK |
| 12. | IC2 | OA | IC1 | * | - | * | - | CUG | OK |
| 13. | | - | IC1 | * | - | * | - | CUG | OK |
| 14. | | - | IC1 | * | - | * | - | CUG | OK |
| 15. | | - | IC1 | * | - | * | - | CUG | OK |

VOICE MAIL SERVICE OF A CLOSED USER GROUP IN A MOBILE COMMUNICATION SYSTEM

BACKGROUND OF THE INVENTION

The invention relates to mobile communication systems and particularly to a method and apparatus for implementing call forwarding in a mobile communication system comprising at least one closed user group of at least one subscriber. The method comprises the steps of detecting conditional or unconditional call forwarding to a defined call forwarding number in connection with call set-up.

In addition to normal speech and data transmission, mobile communication systems provide a plurality of supplementary services for subscribers. Basic services according to the specifications have already been brought into use, and the number of more advanced services based on the intelligent network architecture increases continuously.

One supplementary service included in mobile communication systems is a closed user group. By means of the closed user group several different restrictions concerning the internal or external telecommunications can be defined for a selected group of subscribers. Call restrictions available include e.g. barring of incoming or outgoing calls and barring of long-distance or international calls. Closed user groups are typically applied in companies, in which it is desirable to restrict the use of mobile stations given to employees mainly to professional purposes. In the call set-up process, closed user groups cause additional checks, on the basis of which call set up is either continued normally or is discontinued due to call restrictions.

Another supplementary service provided by mobile communication systems is call forwarding which the subscriber can activate. Call forwarding can be unconditional, i.e. a call is always forwarded to a given new number. Call forwarding can also be defined as conditional e.g. when the subscriber is busy, does not answer, or is not reachable. The most commonly used forms of call forwarding are voice mail services (Voice Mail Service, VMS) in which the subscriber defines that his incoming calls are to be forwarded either unconditionally or conditionally to the VMS center. The center answers calls and stores the messages left for the subscriber.

Upon implementation of call forwarding to the voice mail in a closed user group, situations have arisen in which a call to a member of a closed user group succeeds normally, but call forwarding to the voice mail succeeds or fails depending on the call restrictions and definitions of outgoing access of the called party. For an ordinary user it is not easy to understand restrictions and definitions expressed as technical terms. Therefore, as regards the functionality and reliability of the system, it would be important to be able to utilize the voice mail without difficulty at least in those cases in which the actual call between two subscribers is possible.

SUMMARY OF THE INVENTION

An object of the invention is to provide a method and equipment implementing the method for solving the above-mentioned problem. The object of the invention are achieved with the method comprising the steps of checking whether call forwarding is directed to the voice mail, and performing call forwarding in response to the fact that call forwarding is directed to the voice mail, regardless of a possible bar to call forwarding due to interaction between the call forwarding facility and the closed user group.

The invention also relates to a subscriber data base in which the subscriber's information on call forwarding is stored. The subscriber data base is characterized in that it is arranged to check whether call forwarding is directed to the voice mail, and to forward the call in response to the fact that call forwarding is directed to the voice mail, regardless of a possible bar to call forwarding due to interaction between the call forwarding facility and the closed user group.

The dependent claims relate to the preferred embodiments of the invention.

The invention is based on the idea that the system is arranged to check whether a defined call forwarding number is the number of the voice mail at least before call forwarding fails. If the system detects that the forwarding number in question is the number of the voice mail, checks related to call restrictions are omitted and the call is forwarded to the voice mail regardless of the possible call restrictions.

The inventive solution is implemented by storing the number or numbers of the voice mail in the subscriber data bases of the system and by arranging the subscriber data base to compare the call forwarding number with the voice mail number when forwarding is activated. If the numbers are identical, checks related to the call restrictions are not made.

The method and the system of the invention eliminate the possible problems caused by the restrictions of the closed subscriber group in connection with call forwarding to the voice mail.

BRIEF DESCRIPTION OF THE DRAWINGS

In the following, the invention will be described in greater detail with reference to the accompanying drawings, in which.

DETAILED DESCRIPTION OF THE INVENTION

In the following, the invention will be described by using the functions and structure of the GSM mobile communication system (Global System for Mobile Communications, GSM) as an example, but the invention can also be applied to other similar radio systems which support the call forwarding facility and facilities related to closed user groups.

Figures 1, 2:
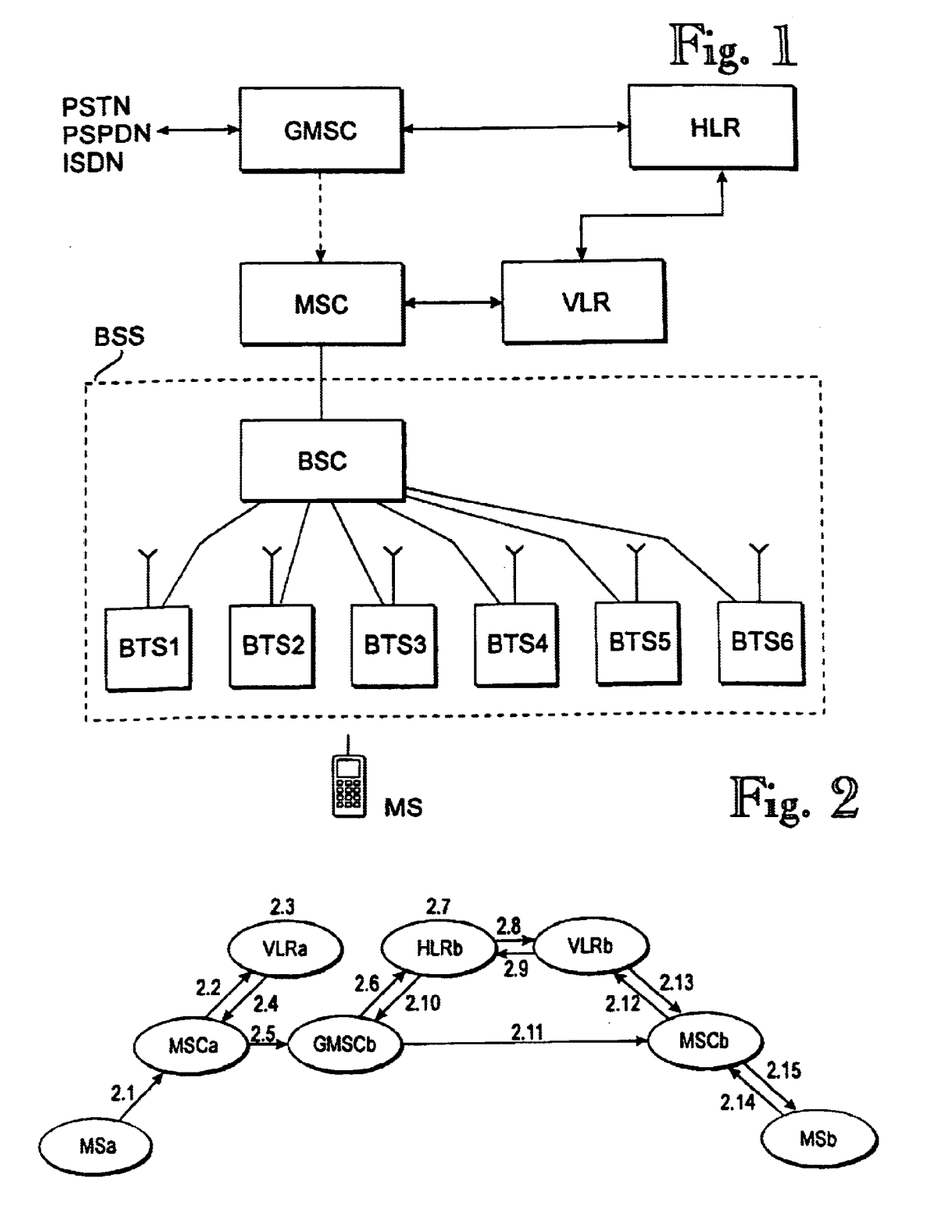
FIG. 1 is a block diagram illustrating basic components of the GSM system at a general level.
FIG. 2 is a block diagram and signalling diagram illustrating call set-up between two mobile stations in a mobile communication system of the GSM type.

FIG. 1 illustrates the basic components of the GSM system without illustrating their features or other components of the system in greater detail. As regards a more precise description of the GSM system, reference is made to the GSM recommendations and The GSM system for Mobile Communications, M. Mouly and M. Pautet, Palaiseau, France, 1992, ISBN: 2-9507190-0-0-7.

A mobile services switching center (MSC) is responsible for switching incoming and outgoing calls. It performs tasks of the same type as the center of the public switched telephone network (PSTN). In addition to these tasks, it carries out functions typical of mobile telephone traffic only, such as management of subscriber location, together with the subscriber registers of a network. In the GSM system a home location register (HLR) and a visitor location register (VLR) function as the subscriber registers. Subscriber data and information on the VLR within which a mobile station (MS) is located are stored permanently in the home location register HLR. The visitor location register VLR in turn stores subscriber data of the mobile station MS temporarily for the period which the mobile station stays in the area of the mobile services switching center related to the visitor location register VLR. One VLR typically serves one mobile services switching center MSC. Mobile stations MS connect to the switching center MSC by means of base station systems (BSS). A base station system BSS comprises base station controllers (BSC) and base transceiver stations (BTS). One base station controller BSC is used for controlling several base transceiver stations BTS.

A closed user group (CUG) is a supplementary service which allows group subscribers of a mobile communication system to define different restrictions for these groups by means of CUG parameters. As regards a more specific description of the CUG facility, reference is made to GSM specifications GSM 02.85 and 03.85. A subscriber may belong to several closed user groups, in the GSM system, for example, the subscriber-specific maximum is ten. In the GSM system, a closed user group is identified unequivocally by means of a CUG interlock code IC. Closed user groups are indicated to a subscriber with a CUG index, which is typically converted in the visitor location register VLR.

Group-specific definitions of the members of a closed subscriber group, hereafter referred to as CUG subscribers, can be further specified by adding or removing restrictions. A CUG subscriber with incoming access (IA) can receive calls from outside the subscriber group. Correspondingly, a CUG subscriber with outgoing access OA can also make calls outside the group. Incoming calls barred (ICB) prevents a CUG subscriber from receiving calls from other members of the same group. Correspondingly, a CUG subscriber with outgoing calls barred (OCB) cannot call to other members of the same group.

Calls terminating to a mobile station will be hereafter referred to as MT calls (Mobile Terminating, MT) and calls originating from a mobile station as MO calls (Mobile Originating, MO). To illustrate a closed user group, the block and signalling diagram of FIG. 2 will be viewed in the following with reference to call set-up between two mobile stations in a mobile communication system of the GSM type. In step 2.1, mobile station MSa sends a request for call set-up to switching center MSCa under the control of which subscriber A is at the moment of transmission. Subscriber A can explicitly define the CUG group that is to be used in connection with the call by giving a CUG index from the mobile station. Switching center MSCa sends a subscriber data interrogation to visitor location register VLRa functioning in connection with it (step 2.2); the interrogation also includes possible CUG information sent in the request for call set-up. If subscriber A has not explicitly given a CUG index, it is checked in the visitor location register VLR whether the subscriber data include the preferred CUG related to the basic service indicated in the request for call set-up. If the preferred CUG has been defined, the closed subscriber group will be determined according to that. If the call setup message does not include CUG information and no preferred CUG has been defined, the call in question is a normal call.

A CUG check is conducted in visitor location register VLRa (step 2.3). During the check a decision is made on the basis of the information given by the subscriber, subscriber data updated in the visitor location register and an MO CUG check function whether the subscriber is entitled to the requested call set-up. As regards a more specific explanation of the MO CUG check function, reference is made to GSM description 03.85 (pages 13–14 in version 4.2.0). In connection with the check a possible CUG index is converted into a CUG interlock code, on the basis of which a mobile communication network identifies the CUG group for which the call is intended. If no CUG information is expressed either explicitly or implicitly, the call is established as a normal call. If the call is allowed on the basis of the CUG check and CUG information is expressed, the call is established as an MO CUG call. In that case, VLRa sends the CUG information back to switching center MSCa (step 2.4) so that call set-up can continue. If the call is not allowed on the basis of the CUG check, visitor location register VLRa informs switching center MSCa that the call has been rejected and call set-up discontinued. The switching center forwards the information to mobile station MSa.

Switching center MSCa transmits the CUG information it received from visitor location register VLRa to the network of subscriber B in call set-up signalling (step 2.5). In the case of FIG. 2 the call enters the first switching center GMSCb of the network of subscriber B, and the switching center sends a routing information interrogation to the home location register HLRb determined by the subscriber's directory number MSISDN (step 2.6). The CUG information received in call set-up signalling is also sent to home location register HLRb in the message on routing information interrogation.

Another CUG check is conducted in home location register HLRb (step 2.7). The purpose of this check is to ensure on the basis of the CUG information received in connection with call set-up, the CUG information of subscriber B stored in home location register HLRb and the MT CUG check that the call is allowed according to the definitions of subscriber A and subscriber B. As regards a more specific description of the MT CUG check function, reference is made to GSM specification GSM 03.85 (pages 14–15 of version 4.2.0). If the call is not allowed according to the CUG check, the HLR discontinues call set-up and sends an indication and explanation of rejection to gateway switching center GMSCb, which forwards the information to the network of subscriber A. If the call is allowed on the basis of the CUG definitions, call set-up is continued normally. During location updating information on the visitor location register VLRb within which subscriber B is has been updated in the home location register HLRb of the subscriber. On the basis of this information home location register HLRb sends a request for reserving a roaming number to visitor location register VLRb (step 2.8). The request for reserving a roaming number includes information on the network resources required by the call. Visitor location register VLRb reserves a roaming number for the subscriber and sends it in a reply message to home location register HLRb (step 2.9), which transmits the roaming number and possible CUG information to the switching center GMSCb that asked for the routing information (step 2.10).

The roaming number space has been defined so that a call is always routed to the switching center MSCb the visitor location register VLRb of which has reserved a roaming number. Hence gateway switching center GMSCb can route the call forward on the basis of the roaming number by sending an initial address message 2.11 to the mobile services switching center MSCb indicated by the roaming number. Having received the initial address message 2.11 switching center MSCb finds out in the roaming number analysis that the call terminates to its own area and is not intended to be routed forwards. In that case, MSCb requests data of the called subscriber for call set-up from its own visitor location register VLRb, message 2.12. The visitor location register VLR sends the necessary data in a reply message 2.13, and if the MSC is capable of providing the necessary resources for data transmission, call set-up signalling is carried out between switching center MSCb and mobile station MSb, which is illustrated with arrows 2.14 and 2.15. With a certain combination of the information included in the incoming call and the subscriber data of subscriber B the visitor location register VLR carries out inverted conversion of the CUG interlock code and sends a CUG index which provides CUG indication in the mobile station MSb of subscriber B back to the switching center MSC.

GSM specification 02.85 describes interaction between a closed user group (hereafter referred to as a CUG group) and call forwarding. In general, for call forwarding of a CUG call to function, the call between subscriber A and subscriber B has to be allowed according to the CUG definitions. A call cannot be forwarded if the CUG definitions of subscriber B bar a call of the type of the call to be forwarded between subscriber B and subscriber C. The call to be forwarded uses the CUG definitions of the calling party (subscriber A), and thus the CUG definitions of subscriber A and subscriber C should in general allow a call between them.

Conditional call forwardings require information on the subscriber status or on the progress of call set-up, and hence they are usually routed via the visitor location register VLR. Information on unconditional call forwarding is stored in the home location register HLR, and thus it is detected already in connection with a routing information interrogation. Call forwarding on mobile subscriber not reachable CFNRc is routed via the register in which the information on the subscriber's accessibility is available. Interaction between a closed user group and call forwarding is checked after the CUG check in cases in which call forwarding is activated. In the case of unconditional call forwarding and conditional call forwarding CFNRc activated by the home location register HLR said interaction is checked in the home location register HLR, and in the case of other conditional call forwardings interaction is checked in the visitor location register VLR.

Figure 3:
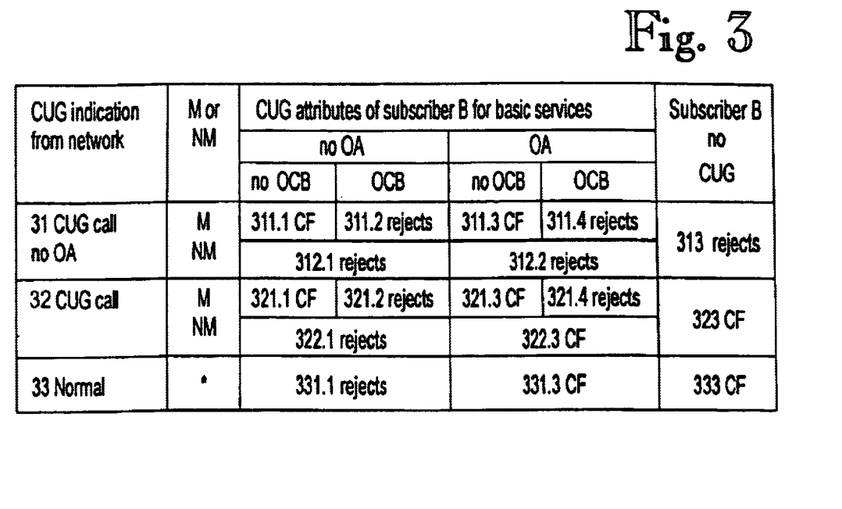
FIG. 3 is a general table illustrating interaction between CUG definitions and the call forwarding facility according to GSM specification 02.85.

FIG. 3 is a general table according to GSM specification 02.85 illustrating interaction between the CUG definitions and the call forwarding facility. The columns of the table represent different CUG definitions of the forwarding subscriber (subscriber B), and the rows of the table represent CUG definitions received from the network. The first two rows of the table are divided into two parts, which separately illustrate cases in which the CUG interlock code included in the incoming call matches (M) or does not match (NM) with the CUG interlock code of subscriber B. Referring to the table, cases in which call forwarding succeeds will be viewed in the following. If a call is rejected due to interaction between call forwarding and a closed user group, the subscriber data base informs the forwarding switching centre of rejection and gives as reason "called party supplementary service interaction violation".

The first row of the table illustrates case 31, in which the call to be forwarded is a CUG call which does not contain a definition for outgoing access OA. If the forwarding subscriber B is a CUG subscriber whose CUG interlock code matches with the one received from subscriber A, and outgoing call barring OCB has not been defined for subscriber B, call forwarding succeeds and the forwarded call includes the CUG interlock code received from subscriber A (cases 311.1 and 311.3) In other cases (311.2, 311.4, 312.1, 312.3 and 313) the call is rejected.

The second row of the table illustrates case 32, in which the call to be forwarded is a CUG call and contains a definition for outgoing access OA. If subscriber B is a CUG subscriber whose CUG interlock code matches with the one received from subscriber A, call forwarding succeeds and the forwarded call includes the CUG interlock code received from subscriber A, but no outgoing access (case 321.1). If subscriber B is a CUG subscriber whose CUG interlock code matches with the one received from subscriber A, and who has outgoing access OA, but no outgoing call barring OCB, call forwarding succeeds and the forwarded call includes the CUG interlock code received from subscriber A and outgoing access OA (case 321.3). If subscriber B is a CUG subscriber whose CUG interlock code matches with the one received from subscriber A, and who has outgoing access OA, but no outgoing call barring OCB, the call can be forwarded as a normal call (case 321.4).

If subscriber B is a CUG subscriber whose CUG interlock code does not match with the CUG interlock code of subscriber A, but who has incoming access IA and outgoing access OA, call forwarding succeeds and the forwarded call includes the CUG interlock code received form subscriber A and outgoing access OA (case 323). In other cases (cases 321.2 and 322.1) call forwarding fails.

The third row of the table shows case 33, in which the call to be forwarded does not contain CUG information. If subscriber B is a CUG subscriber for whom outgoing access has been defined, the call is forwarded as a normal call (case 333). In other cases (case 331.1) call forwarding fails.

Figure 4:
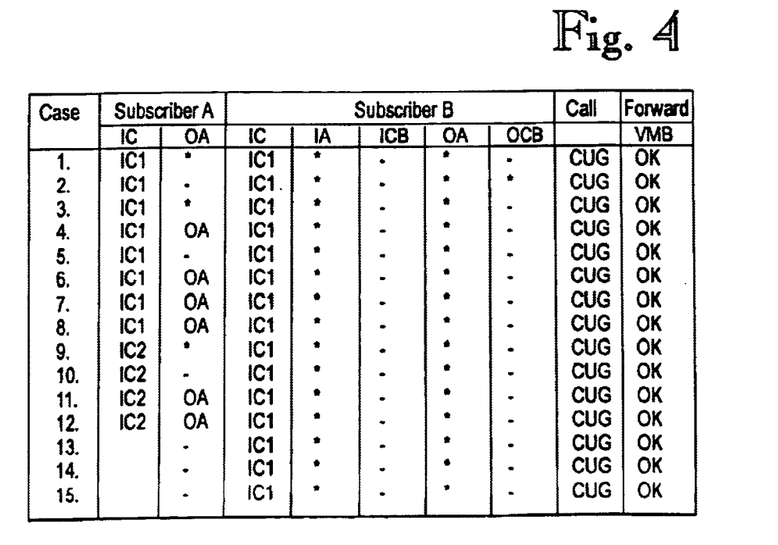
FIG. 4 is a table illustrating how the definitions of call forwarding and the closed subscriber group described above at general level influence call set-up and call forwarding to the voice mail.

In FIG. 4 there is a table illustrating how call forwarding and closed user group definitions described above at general level influence call set-up and call forwarding to the voice mail. In Table 4 subscriber B is a member of the CUG group to be defined with the interlock code IC1, and the table illustrates situations in which the calling subscriber A is a member of the same CUG group (IC1), or of another CUG group (IC2), or a normal subscriber. As for subscriber A, the table shows the influence of the additional definition OA, which together with the additional definitions of subscriber B affect the fact whether the call is rejected, connected as a CUG call, or connected as a normal call. If an additional definition is in use, there is 'OA' in the column of the table. Sign '-' in the column means that no additional definition is in use. If the definition does not have significance as regards the last two columns under discussion, there is sign '*' in the column. Corresponding markings have also been used in other columns of the table.

As regards subscriber B, the table illustrates the influence of additional definitions IA, ICB, OA and OCB on the cases under discussion. The column 'Call' illustrates cases in which a call is connected as a normal call (NORM), or as a CUG call (CUG) and cases in which a call is rejected (REJ). The last column of the table illustrates cases (INV) in which forwarding to the voice mail fails due to CUG checks, even though either an ordinary or a CUG call can be made between subscriber A and subscriber B.

In cases 4.2 and 4.3 subscriber A and subscriber B are members of the same CUG group, and no outgoing call barring has been set to subscriber B, and thus, the call between the subscribers will be connected as a CUG call. However, outgoing call barring OCB inside CUG has been set to subscriber B, and thus forwarding to the voice mail fails. Forwarding succeeds only if outgoing access OA has been set to subscriber B (cf. case 4.4).

In case 4.8 subscriber A and subscriber B are members of the same CUG group. Subscriber B has incoming call barring ICB, but since subscriber A has outgoing access OA, the call can be connected as a normal call. Subscriber B does not, however, have outgoing access OA, and thus forwarding to the voice mail fails, since the call to be forwarded is a normal call.

In case 4.11 subscriber A and subscriber B are members of different CUG groups, but since subscriber A has outgoing access OA, the call can be connected as a normal call. As in the above case, subscriber B does not have outgoing access OA, and thus forwarding to the voice mail fails, since the call in question is a normal call.

In case 4.14 subscriber A is not a member of a closed user group, and thus the call is connected as a normal call. Forwarding to the voice mail fails again, since subscriber B does not have outgoing access OA.

All the cases described above are normal situations arising from the nature of the CUG definitions, and they do not contain any error as such. In order to understand them one has to have rather profound technical knowledge of the CUG groups and the restrictions and interaction caused by the CUG definitions. A normal subscriber, who merely uses the features defined for himself and notes that they sometimes work and sometimes not, does not consider the cause for failure but regards the supplementary service as prone to errors and unreliable. The invention allows to avoid such situations.

Figure 5:
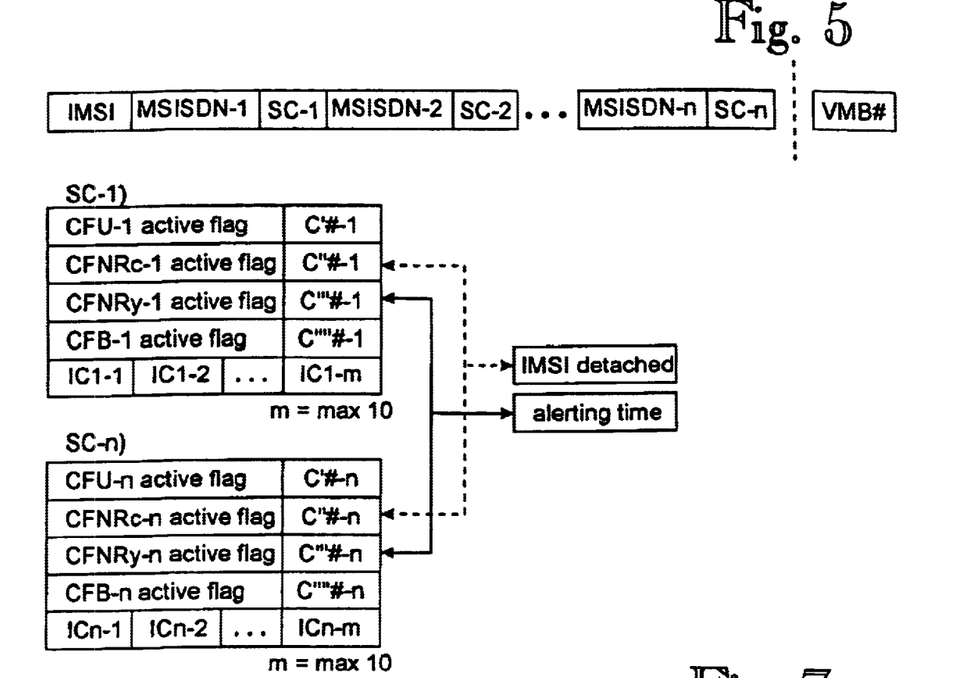
FIG. 5 illustrates in general how subscriber data are provided in the home location register for a subscriber who has at his disposal basic services.

In the following, preferred embodiments will be described with reference to FIGS. 5 and 6. FIG. 5 illustrates in general how subscriber data provided in the home location register for a subscriber who has at his disposal n basic services. The subscriber has an international mobile subscriber identity IMSI of his own, which is used as a subscriber identity within the mobile communication network. Services defined for the subscriber are attached to the subscriber's IMSI. According to the principle of a multiple subscriber number system, each subscriber service 1 . . . n is given a directory number of its own MSISDN-1 . . . MSISDN-n. There is one basic service code SC-1 . . . SC-n which determines the call type related to each MSISDN number. The basic service code is one of the above-mentioned teleservice or bearer service codes.

It is possible to choose four different call forwarding services for each basic service, i.e. "call forward unconditional CFU" and conditional call forwardings "call forward on mobile subscriber not reachable CFNRc", "call forward on no reply CFNRy" and "call forward busy CFB". The CFNRc service contains information on the inaccessibility of the subscriber (IMSI detach) and the CFNRy service contains information on the time (alerting time) within which the subscriber is expected to answer the call. There can be at most ten CUG interlock codes IC-1 . . . IC-n related to each basic service. One of these may be the preferred CUG interlock code, and the other codes can be selected by the subscriber from his mobile station at the beginning of the call.

Figure 6:
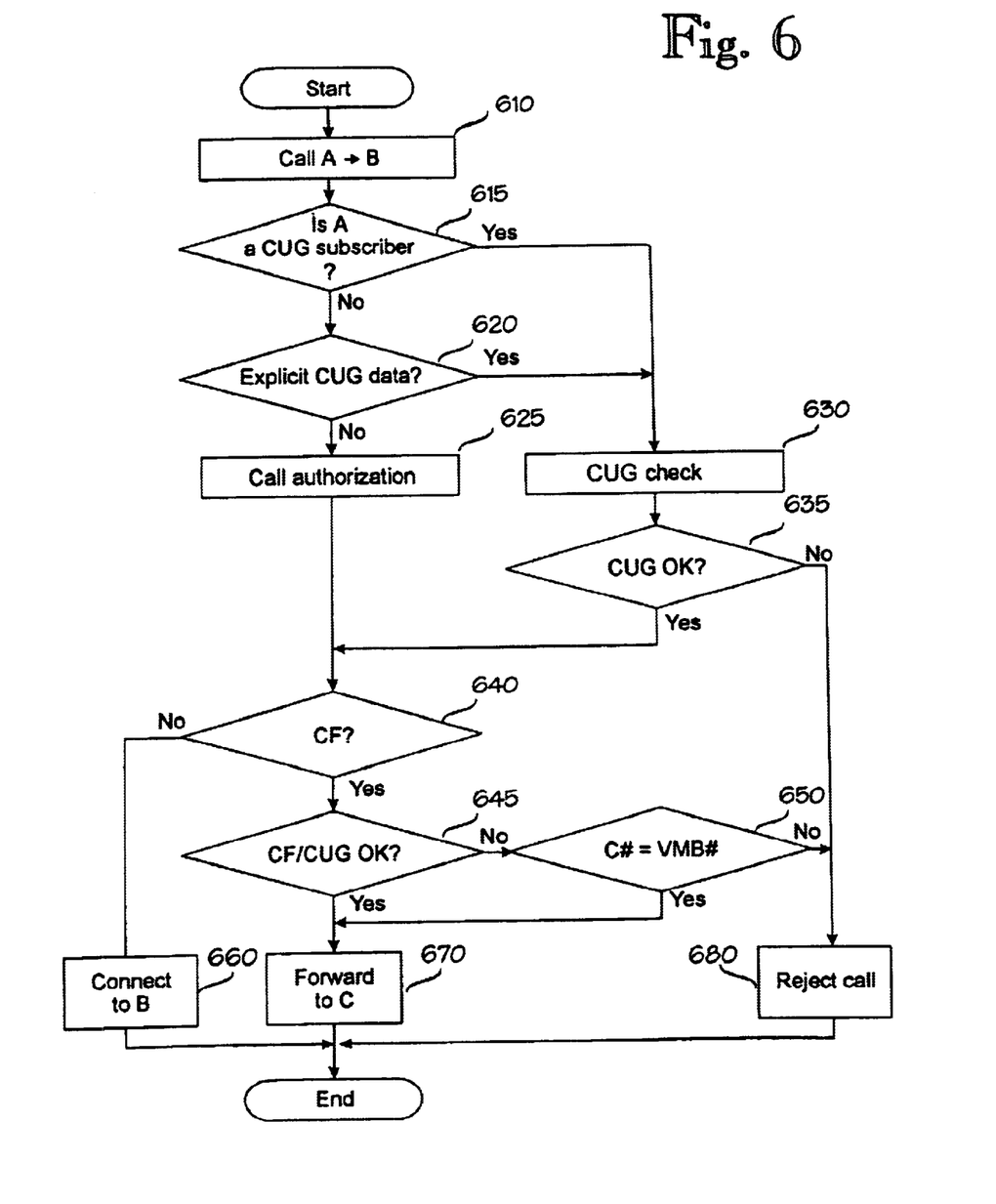
FIG. 6 is a flow chart illustrating the inventive solution in connection with an MT CUG call, when call forwarding is detected in the home location register HLR.

The flow chart in FIG. 6 illustrates the inventive solution in connection with an MT CUG call when call forwarding is detected in the home location register HLR. In step 610, the home location register HLR receives the routing information interrogation which is sent by the gateway switching centre GMSC and relates to the call from the calling party (subscriber A) to the called party (subscriber B). In step 615, the home location register HLR checks whether subscriber B has CUG definitions related to the basic service. If there are no such definitions, the home location register also checks whether the call set-up message includes CUG definitions given by subscriber A (step 620). If there are no such definitions either, normal incoming call authorization is carried out (step 625). If CUG definitions were found, a CUG check will be conducted in the home location register HLR on the basis of the CUG definitions of subscriber A and subscriber B (step 630). If the CUG definitions of subscriber A and subscriber B are incompatible, the call is rejected and call set-up discontinued (step 680). If the call can be continued on the basis of the CUG definitions, the home location register checks whether call forwarding related to the basic service related to the call has been defined for subscriber B (step 640). If call forwarding has not been defined, the home location register HLR makes a request for reserving a roaming number and sends the routing information to the gateway switching centre GMSC (step 660). If call forwarding has been defined, the home location register HLR checks whether call forwarding is allowed on the basis of CUG interaction (step 645). If call forwarding is allowed, the home location register HLR sends the information on call forwarding and the call forwarding number back to the gateway switching centre GMSC (step 670).

In cases in which said call forwarding cannot be performed due to CUG interaction, the call would be rejected according to the prior art (step 680). To avoid the problem the home location register, on noticing that call forwarding fails due to CUG interaction, conducts an additional check (step 650), in which the call forwarding number is compared with the voice mail number. If the numbers are identical, i.e. forwarding is directed to the voice mail, forwarding is allowed regardless of interaction (step 670). Only if the call forwarding number is a number other than the voice mail number, the home location register HLR sends information on rejection of the call to the gateway switching centre GMSC (step 680). According to the prior art, the home location register does not have information on the voice mail number given to the subscriber. One preferable way of providing prerequisites for the check of the invention is to save at least the allowed voice mail number VMB# with which the call forwarding number can be compared in the home location register HLR according to FIG. 5.

Figure 7:
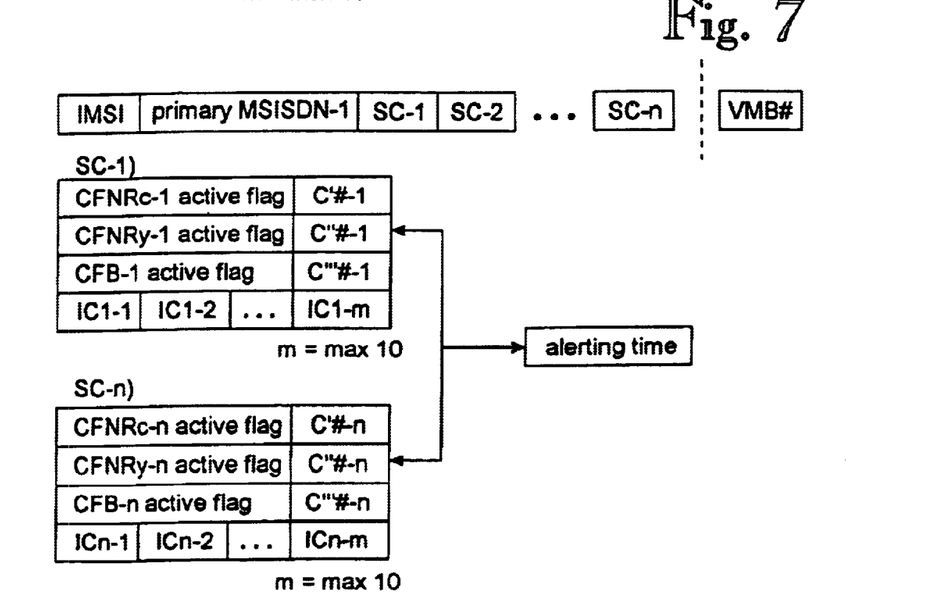
FIG. 7 illustrates at general level information on call forwarding updated in the visitor location register VLR in connection with location updating in the GSM system.

FIG. 7 illustrates at general level call forwarding information updated in the visitor location register in connection with location updating in the GSM system. At least IMSI and the primary MSISDN, i.e. the MSISDN in accordance with the primary service, are transmitted from the home location register HLR to the visitor location register VLR. Usually, the primary MSISDN is the MSISDN connected to the speech service. In addition to these, a list of special services at the user's disposal and the related information, e.g. information on activation and call forwarding numbers, are updated in the visitor location register VLR. Since unconditional call forwarding CFU is routed via the home location register HLR, information related to it is not updated in the visitor location register VLR.

One way of providing the information needed for the check of the invention for the visitor location register VLR is to arrange the home location register HLR to send the voice mail number VMB# to the visitor location register e.g. in an INSERT message, in which subscriber data are typically transmitted from the home location register HLR to the visitor location register VLR in connection with location updating. According to the GSM recommendations, an extension can be attached to the INSERT message for additional information of the invention. The visitor location register VLR acknowledges each INSERT message, and several INSERT messages can be sent in sequence if the information does not fit in one message.

Figure 8:
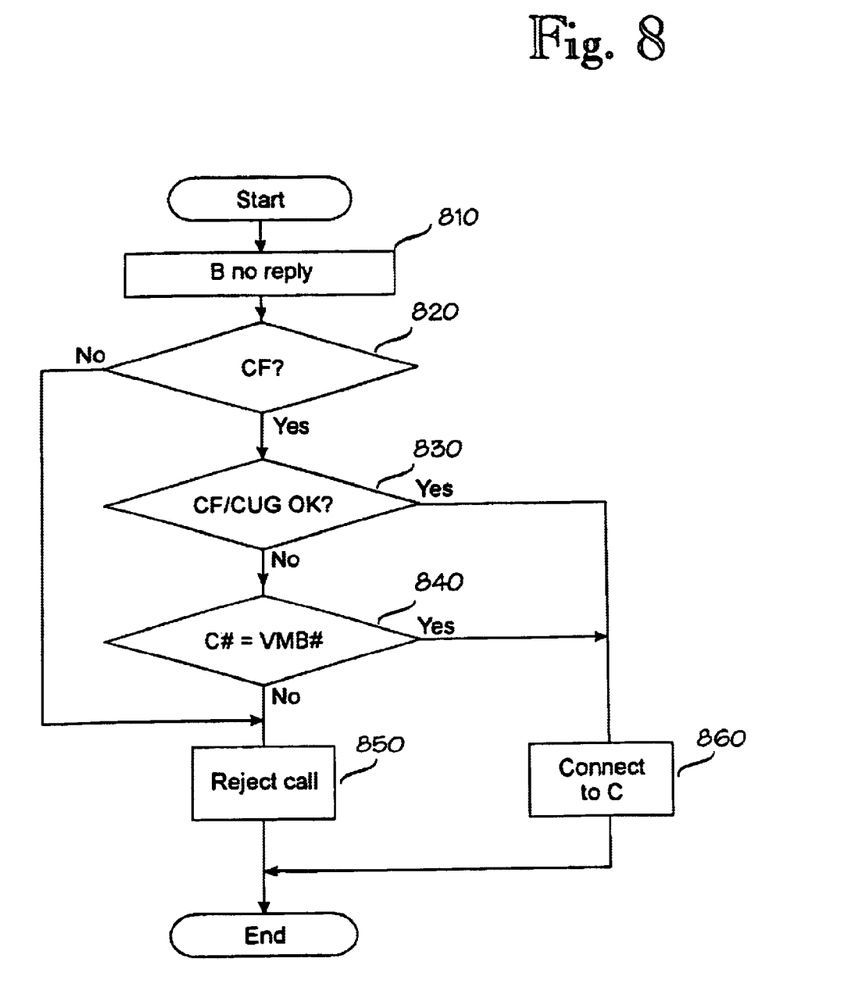
FIG. 8 illustrates the inventive solution in connection with an MT CUG call when the subscriber does not answer.

FIG. 8 illustrates the inventive solution in connection with an MT CUG call when the subscriber does not answer. In that case, call forwarding is detected in the visitor location register VLR. Since the call in question is a mobile terminating call MT, the CUG check has already been conducted in the home location register HLRb of subscriber B. In step 810, the visitor location register detects that subscriber B does not answer an incoming call. After a predefined alerting time the system checks in the visitor location register (step 820) whether the subscriber has defined conditional call forwarding related to the case. If no information on such call forwarding is found, call set-up ends, and information on termination of the call is sent to subscriber A (step 850). If information on call forwarding is found in the visitor location register VLR (CFNRY active flag), check is conducted on interaction of call forwarding and the definitions related to the closed user group (step 830). If call forwarding is allowed on the basis of interaction, the call is connected to the call forwarding number (step 860). If call forwarding is forbidden because of interaction, an additional check of the invention is conducted, the check comprising comparing the call forwarding number C# with the voice mail number VMB# (step 840). If the numbers are identical, call forwarding is allowed and call setup is continued to the call forwarding number (step 860).

In the above examples the check was conducted in a situation in which call forwarding failed because of interaction. The check of the invention can, however, also be added to some other step of the process. A check can be conducted, for example, before checking interaction between the call forwarding facility and the CUG definitions, whereby interaction between the call forwarding facility and the closed user group is checked only when call forwarding is not directed to the voice mail.

It is obvious to one skilled in the art that as the technology develops, the inventive concept can be implemented in many different ways. Hence the invention and its embodiments are not limited to the above examples, but vary within the scope of the appended claims.

What is claimed is:

1. A method for implementing call forwarding in a mobile communication system having at least one closed user group of at least one subscriber, the method comprising:

detecting one of a conditional and unconditional call forwarding to a call forwarding number in connection with call set-up;

checking whether said call forwarding is directed to voice mail;

checking whether interaction between a call forwarding facility and the closed user group bars call forwarding; and in response to said call forwarding being directed to the voice mail, performing call forwarding and ignoring a bar to call forwarding due to interaction between the call forwarding facility and the closed user group.

2. A method as claimed in claim 1, wherein said checking whether interaction between the call forwarding facility and the closed user group bars call forwarding call forwarding is not directed to the voice mail.

3. A method as claimed in claim 1, wherein said checking whether said call forwarding is directed to voice mail comprises:

comparing a call forwarding number with a voice mail number; and interpreting call forwarding as call forwarding directed to the voice mail when said call forwarding number and said voice mail number are identical.

4. The method as claimed in claim 1, wherein the check whether said call forwarding is directed to voice mail is conducted in a subscriber data base.

5. The method as claimed in claim 1, wherein a subscriber data base is a home location register (HLR) or a visitor location register (VLR).

6. The method as claimed in claim 1, further comprising:

storing at least one voice mail number related to the subscriber in a home location register (HLR) of the at least one subscriber; and transferring at least one voice mail number related to the at least one subscriber from the home location register (HLR) to a visitor location register (VLR) in connection with location updating, wherein said checking whether call forwarding is directed to the voice mail includes comparing a call forwarding number with said at least one voice mail number.

7. A subscriber data base of a mobile communication system in which subscriber information on call forwarding is stored, comprising:

a portion of the subscriber data base being arranged to check, in response to activation of call forwarding, whether call forwarding is directed to voice mail;

a second portion of the subscriber data base being arranged to check whether interaction between a call forwarding facility and the closed user group bars call forwarding; and a third portion of the subscriber data base being arranged to perform call forwarding in response to said call forwarding being directed to the voice mail, regardless of a bar to call forwarding due to interaction between the call forwarding facility and a closed used group.

8. A subscriber data base as claimed in claim 7, wherein the subscriber data base is arranged to check whether said interaction between the call forwarding facility and the closed user group bar call forwarding only if call forwarding is not directed to the voice mail.

9. A subscriber data base as claimed in claim 7, wherein the subscriber data base is the subscriber's home location register (HLR), which is arranged to store at least one voice mail number related to the subscriber, and transfer said at least one voice mail number related to the subscriber from the home location register (HLR) to the visitor location register (VLR) in connection with location updating, wherein said portion of the subscriber data base arranged to check whether call forwarding is directed to the voice mail makes a determination of the call forwarding being directed to the voice mail by comparing a call forwarding number with the at least one voice mail number.

10. A subscriber data base as claimed in claim 7, wherein the subscriber data base is a visitor location register (VLR)

which stores subscriber data permanently and is arranged to store at least one voice mail number transferred from the home location register (HLR) to the visitor location register (VLR) in connection with location updating, and check whether call forwarding is directed to the voice mail by comparing a call forwarding number with the at least one voice mail number.

11. An arrangement for implementing call forwarding in a mobile communication system having a mobile services switching center, subscriber data bases and at least one closed user group of at least one subscriber, the arrangement comprising:

a mechanism configured to interrogate a data base from the mobile services switching center to the subscriber data base in connection with call set-up;

a mechanism configured to check the at least one subscriber's call forwarding settings in the subscriber data base;

a mechanism configured to check whether call forwarding is directed to voice mail in response to detected call forwarding set by the subscriber, and a mechanism configured to perform call forwarding call forwarding in response to call forwarding being directed to the voice mail, regardless, of a bar to call forwarding due to interaction between a call forwarding facility and the at least one closed user group.

12. The arrangement as claimed in claim 11, wherein the mechanism configured to check whether call forwarding is directed to the voice mail only when interaction between the call forwarding facility and the closed user group bars call forwarding.

13. The arrangement as claimed in claim 11, wherein the mechanism configured to perform call forwarding checks whether interaction between the call forwarding facility and the closed user group bars call forwarding only when call forwarding is not directed to the voice mail.

14. An arrangement as claimed in claim 11, wherein a call forwarding number is compared with a voice mail number, the comparison being used by said mechanism configured to check whether call forwarding is directed to voice mail to interpret call forwarding as being directed to the voice mail when the numbers are identical.

15. An arrangement as claimed in claim 11, wherein said mechanism configured to check whether call forwarding is directed to voice mail is included in the subscriber data base.

16. An arrangement as claimed in claim 15, wherein the subscriber data base is one of a home location register (HLR) and a visitor location register (VLR).

17. An arrangement as claimed in claim 11, further comprising:

a subscriber's home location register arranged to store at least one voice mail number related to the at least one subscriber wherein the home location register is arranged to transfer the at least one voice mail number related to the at least one subscriber to a visitor location register in connection with location updating; and wherein the subscriber data bases are arranged to check whether call forwarding is directed to the voice mail by comparing a call forwarding number with the at least one voice mail number.

* * * * *